Patented Sept. 19, 1922.

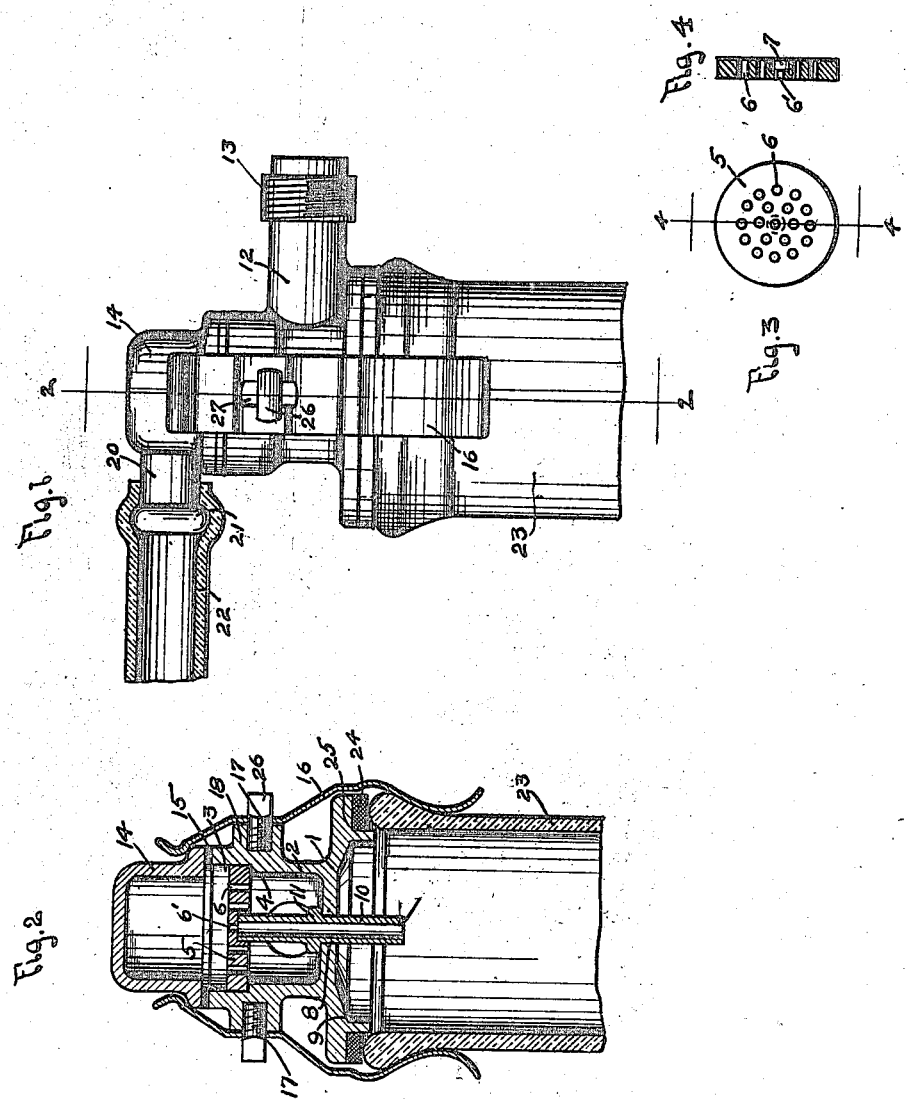

1,429,710

UNITED STATES PATENT OFFICE.

BERTIE BRAYSHAW, OF FORT ATKINSON, WISCONSIN, ASSIGNOR, BY MESNE ASSIGNMENTS, TO THE GENERAL TOOL & MANUFACTURING COMPANY, OF MILWAUKEE, WISCONSIN, A CORPORATION OF WISCONSIN.

SAMPLE TAKER.

Application filed June 14, 1920. Serial No. 388,975.

*To all whom it may concern:*

Be it known that I, BERTIE BRAYSHAW, a citizen of New Zealand, and a resident of Fort Atkinson, in the county of Jefferson and State of Wisconsin, have invented a new and useful Improvement in Sample Takers, of which the following is a full, clear, and exact description.

My invention relates to improvements in sample takers, and it consists in the combinations, constructions and arrangements herein described and claimed.

An object of my invention is to provide a sample taker adapted to be used with a milking machine for taking, for testing, or other purposes, a predetermined proportionate part of the milk being obtained.

A further object of my invention is to provide a device of the type described in which provision is made for diverting into a bottle of an ordinary construction, a desired proportionate quantity of the total quantity of milk being obtained.

A further object of my invention is to provide a device of the type described in which provision is made for instantly assembling the various parts, which can be disassembled with equal rapidity to permit the same being cleaned.

A further object of my invention is to provide a device of the type described which is relatively simple in construction and operation, not liable to easily get out of order, and thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a side elevation illustrating an embodiment of the device as operatively applied, Figure 2 is a section along the line 2—2 of Figure 1, Figure 3 is a detailed plan view of a portion of the device, and Figure 4 is a section along the line 4—4 of Figure 3.

In carrying out my invention, I provide a tubular member which is preferably formed of a single casting having a body portion 1 fashioned with a central inner bore or compartment 2. The latter is enlarged at its upper end at 3, thus providing an annular shoulder 4.

A disc 5 formed with a plurality of openings 6 which are spaced at equal distances apart about a central opening, as clearly shown in Figure 3, is placed within the enlarged portion 3 and rests upon the shoulder 4. The proportion of the total quantity of milk obtained that is taken by the device for testing or other purposes is determined by the number of openings 6 which are formed through the disc 5, as will hereinafter be more fully set forth. The disc 5 is fashioned with a central socket 7 located in its under surface. A central opening 6′ communicates with the center of the socket 7, but the openings 6 are not in communication with the latter.

A central opening 8 connects the inner bore or compartment 2 with a recess 9 which is formed in the lower end of the body portion 1. A tube 10, provided with an exteriorly extending flange 11 intermediate its length, has its upper end disposed within the central socket 7 which is formed in the disc 5 and which is of such length that the flange 11 then rests upon the inner bottom surface of the compartment 2, while the lower portion of the tube extends below the lower level of the tubular body portion 1.

The tubular body portion 1 is provided with an outlet tube 12 which communicates with the central compartment 2 and leads to a releaser or receptacle (not shown). A screw threaded portion 13 provides a means for connection with the releaser or receptacle.

A cap 14 of the shape clearly shown in the accompanying drawings is placed in position to close the upper end of the enlarged portion 3 of the inner compartment 2. A gasket 15 is disposed between the cap 14 and the wall of the tubular body portion 1 to prevent leakage. The cap 14 is held in position by a pair of springs 16 which are bent into the shape shown in Figure 2 of the accompanying drawings, and are maintained in position by screws 17 which are screwed into opposite laterally extending lugs 18 at diametrically opposite points. The latter, as will be noted, are formed integrally with the tubular body portion 1. The cap 14 is fashioned with an inlet tube 20 have a bead 21 at its end. The end of the rubber tube 22 is stretched and pulled over the beaded end of the inlet tube 20 and will remain in place on account of the resiliency of the material comprising the rubber tube.

An annular recess 25 is formed in the lower end of the tubular body portion 1 and is adapted to receive the neck of a bottle 23 which is of an ordinary construction. A gasket 24 is interposed between the neck of the bottle and the wall of the recess 25 to prevent leakage.

From the foregoing description of the various parts of the device, the operation thereof may be readily understood. The tube 22 communicates with the teat cups and the milk passing therethrough will enter the enlarged portion 3 of the tubular compartment 2. It will be observed that only the central opening 6' is in communication with the tube 10 which depends within the neck of the bottle 23. The quantity of milk passing through the central opening 6' into the bottle 23 can therefore be accurately determined, since the proportion will be determined by the number of additional openings 6 provided in the disc 5 at spaced distances about the central opening 6'. For example, if there are, as illustrated in the drawings, 19 holes formed through the disc 5 part of the milk will pass into the inner compartment 2 and thence through the outlet tube 12 to the releaser or receptacle, while 1/19 of the total quantity will pass through the tube 10 into the bottle 23.

The device is so formed that the cap may be placed in position by merely pressing against the same, and the springs 16 will yield sufficiently to permit the movement of the cap into position. The cap will then be held by the springs 16. Likewise, the neck of the bottle will be held within the recess 25 by the springs 16 and is inserted therein by pushing the neck of the bottle against the outturned ends of the springs which will yield to permit the entrance of the neck of the bottle into the recess 25.

One of the main advantages of the device lies in the fact that various parts can be instantly assembled and as quickly disassembled. It will be noted that the screws 17 are formed with longitudinal heads 26, as shown in Figure 1. The springs 16 have longitudinal slots 27 adapted to permit the removal of the springs from the position, shown in Figure 1, when the springs are grasped and turned until the longitudinal slot 27 extends in the same direction as the longitudinal head 26.

The device provides a means for accurately measuring a certain proportionate part of the total quantity of milk, and for segregating such accurately determined proportionate part for testing or other purposes.

I claim:

1. A sample taker comprising a hollow body portion having a tube extending through the bottom of said body portion, a disc carried by the body portion and arranged to bear on the end of the tube, said disc having a perforation arranged to register with the tube for admitting fluid therein and having other perforations for admitting fluid into the body portion, an outlet, a cap covering said body portion and being provided with an inlet, and spring means for securing said cap to said body portion.

2. A sample taker comprising a hollow body portion having a tube extending through the bottom of said body portion, a disc carried by the body portion and arranged to bear on the end of the tube, said disc having a perforation arranged to register with the tube for admitting fluid therein and having other perforations for admitting fluid into the body portion, an outlet, a cap covering said body portion and being provided with an inlet, a receiver disposed below the body portion, and spring means for securing said cap and said receiver to said body portion.

3. A sample taker comprising a hollow metal body portion having outwardly extending lugs and being provided with an outlet near its bottom, a vertically extending tube carried by said body portion, a horizontally disposed disc supported at its edges by said body portion and having a recess arranged to receive the upper end of the tube, said disc having an opening arranged to register with the tube, and other openings out of registration for establishing communication between the upper and lower parts of said body portion, a cap having an inlet, a receiver disposed below said body portion, and springs secured to said lugs for securing said cap and said receiver to said body portion.

4. A sample taker comprising a hollow metal body portion having outwardly extending lugs and being provided with an outlet near its bottom, a vertically extending tube carried by said body portion, a horizontally disposed disc supported at its edges by said body portion and having a recess arranged to receive the upper end of the tube, said disc having an opening arranged to register with the tube, and other openings out of registration for establishing communication between the upper and lower parts of said body portion, a cap having an inlet, a receiver disposed below said body portion, and springs secured to said lugs for securing said cap and said receiver to said body portion, said springs having slots and screws for fastening said springs to said lugs, said screws having elongated heads arranged to pass through said slots when said springs are turned at right angles to their ordinary holding position.

BERTIE BRAYSHAW.